(12) United States Patent
Jaarda et al.

(10) Patent No.: US 7,568,746 B2
(45) Date of Patent: Aug. 4, 2009

(54) DUAL STAGE ENERGY ABSORBER

(75) Inventors: Eric Jon Jaarda, Milan, MI (US);
Michael R. Mahfet, Rochester Hills, MI (US); Subhransu Mohapatra, Bangalore (IN); Dhanendra Kumar Nagwanshi, Bangalore (IN); Sreeram Tirunellai Ramani, Tamilnadu (IN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 87 days.

(21) Appl. No.: 11/740,511

(22) Filed: Apr. 26, 2007

(65) Prior Publication Data

US 2007/0278803 A1   Dec. 6, 2007

Related U.S. Application Data

(63) Continuation-in-part of application No. 11/622,014, filed on Jan. 11, 2007, now abandoned.

(60) Provisional application No. 60/774,259, filed on Feb. 16, 2006.

(51) Int. Cl.
*B60R 19/26* (2006.01)
(52) U.S. Cl. .................. 293/132; 293/102; 293/130
(58) Field of Classification Search ............... 293/102, 293/130, 132, 133, 135, 136, 146, 147, 148
See application file for complete search history.

(56) References Cited

U.S. PATENT DOCUMENTS

| | | | |
|---|---|---|---|
| 3,933,387 A | 1/1976 | Salloum et al. | |
| 6,290,272 B1 | 9/2001 | Braun | |
| 6,360,441 B1 * | 3/2002 | Himsl et al. | 293/102 |
| 6,443,511 B2 * | 9/2002 | Braun | 293/120 |
| 6,536,818 B1 | 3/2003 | Moss | |
| 6,601,886 B1 | 8/2003 | Thayer | |
| 6,793,256 B2 | 9/2004 | Carley et al. | |
| 2004/0036302 A1 | 2/2004 | Shuler et al. | |
| 2004/0094975 A1 | 5/2004 | Shuler et al. | |
| 2004/0169381 A1 | 9/2004 | Evans et al. | |
| 2004/0256867 A1 * | 12/2004 | Evans et al. | 293/102 |
| 2005/0057053 A1 | 3/2005 | Evans et al. | |
| 2005/0287371 A1 | 12/2005 | Chaudhari et al. | |

FOREIGN PATENT DOCUMENTS

EP   1369309   12/2003

* cited by examiner

*Primary Examiner*—Lori L Lyjak (57) ABSTRACT

A motor vehicle bumper that has enhanced energy absorption characteristics and that includes one or more unique geometry configurations that extend "softer" energy absorbing surfaces forward in the system while nesting more "rigid" energy absorbing surfaces more rearward only to come into effect when higher energy impacts are observed. The dual energy absorption may be achieved using a number of configurations and/or methods or a combination of several. In one or more embodiments, the wall thickness of the material used in the component or components may be varied, materials having different stiffness properties may be used, and/or geometries of different depth and section stiffness may be alternated across the bumper system.

15 Claims, 4 Drawing Sheets

DUAL STAGE ENERGY ABSORBER

CROSS REFERENCE TO RELATED APPLICATION

This application is a Continuation-in-Part of U.S. Original application Ser. No. 11/622,014, which was filed Jan. 11, 2007 now abandoned and claims priority to Provisional Application No. 60/774,259, which was filed Feb. 16, 2006.

FIELD OF INVENTION

The present invention relates to motor vehicle components and, in particular, to motor vehicle bumpers capable of absorbing impact energy.

BACKGROUND OF INVENTION

In the current automotive environment, vehicles that are exported to other global regions must be designed appropriately to meet different regulatory requirements for the various vehicle systems. As a result most vehicles for export require a different bumper system to meet the specific requirements of the region to which they are exported. This usually requires multiple bumper components for the same vehicle so that a different bumper system can be assembled for the specific region destination. This requires additional investment for tooling, equipment, labor, assembly space, etc. Since several of the various region requirements conflict, no system has been designed that is capable of meeting all the global requirements with a single bumper system.

Previous prior art bumper systems that were designed to address the issue of meeting multiple, conflicting requirements with the same bumper system have been attempted. These prior art bumper systems have been designed to include a large area for energy absorption in the bumper area of the vehicle. However, this approach is very impractical and often impossible due to the styling requirements of current automobiles.

In addition, while many automobiles have their own designs for absorbing the force and energy associated with a collision, such as crumple zones, many of these designs fail to satisfy the regulatory requirements of various countries. These designs are often aimed at protecting the individual in a vehicle from high-impact collisions. Nevertheless, damage may also be sustained in low-impact collisions. While many automobiles do include designs selected to help protect the vehicle during low impact collisions, these designs do not take into account the possible damage to the object struck. For example, in instances wherein the low-impact collision is with a pedestrian, no provisions are provided in the bumper design for protecting the civilians, although such provisions are now required in certain countries.

SUMMARY OF THE INVENTION

The present invention addresses the issues associated with prior art bumper systems by using a dual stage energy absorption bumper system that includes one or more unique geometry configurations that extend "softer" energy absorbing surfaces forward in the system while nesting more "rigid" energy absorbing surfaces more rearward only to come into effect when higher energy impacts are observed. The dual energy absorption may be achieved using a number of configurations and/or methods or a combination of several. In one or more embodiments, the wall thickness of the material used in the component or components may be varied, materials having different stiffness properties may be used, and/or geometries of different depth and section stiffness may be alternated across the bumper system.

Accordingly, in one aspect, a motor vehicle bumper is provided. The motor vehicle bumper includes a first energy absorbing stage having at least one first stage element having a first impact resistance; and a second energy absorbing stage having a second impact resistance; wherein the first impact resistance is less than the second impact resistance. The at least one first stage elements may include a plurality of first stage elements. Each of the first stage elements may compose a "C"-shaped loop that is connected to the second energy absorbing stage at each end of the "C"-shaped loop. Each "C"-shaped loop may be substantially rectangular shape. The first energy absorbing stage may also include at least one intermediate element located between the at least one first stage element and the second energy absorbing stage.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

The present invention provides an improved motor vehicle bumper and method of making such a bumper. The bumper system provides a single bumper system that includes at least two energy absorption stages that provide different energy absorption characteristics to the bumper. The first energy absorbing stage provides an energy absorption characteristic that is generally useful for low-impact and/or low-speed collisions. The second energy absorbing stage provides an energy absorption characteristic that is generally useful for high-impact and/or high-speed collisions.

Accordingly, in a first aspect, the present invention provides a bumper system having a first energy absorbing stage designed to provide a first level of energy absorbance. This first energy absorbing stage is designed to provide a majority of the energy absorbance needed during a low-impact and/or low-speed collision. As such, the first energy absorbing stage is designed to have a lesser impact resistance or stiffness than the second stage such that the first energy absorbing stage requires less force to alter the shape and/or dimensions of the first stage during an impact. By being designed such that the first energy absorbing stage has a lesser impact resistance, during an impact, the first energy absorbing stage will absorb more energy and will yield or bend more easily such that the object hitting bumper system receives less counter-force from the bumper system as a result of the first stage. As such, during a low-impact collision, the object struck will receive less of the force from the collision, with the first energy absorbing stage being designed to absorb most, if not all, of the remaining force.

The first energy absorbing stage may be designed to have a lower impact resistance through one or more first stage elements. These elements may be designed according to one or more factors including, but not limited to, the shape of the first stage elements, the materials used to construct the first stage elements, the use of first stage elements having different impact resistances, and/or the use of first stage elements that are constructed from different materials.

Accordingly, in one aspect, the first stage elements may be designed to have a lesser impact resistance as a result of the shape of the elements. The first stage elements may, in one embodiment, include a looped structure that projects from the bumper system, wherein the closed portion of the loop extends furthest from the motor vehicle to which the bumper system is attached. Alternatively, the first stage elements may be closest to the vehicle with the second stage being furthest from the motor vehicle.

In one embodiment of the present invention, when loops are utilized as the first stage elements, the loops, from a side view, resemble the letter "C". The loops may have any shape that is capable of providing a lesser impact resistance. Accordingly, in one embodiment, the loops may be rounded in shape. In an alternative embodiment, the loops may be rectangular in shape. In still other embodiments, the loops may be square in shape or any other geometric shape that permits these first stage elements to have a lesser impact resistance than the remainder of the bumper system. In addition, the cross-section of the loops may be substantially flat in some embodiments and corrugated in alternative embodiments to provide additional stiffness.

The number of first stage elements on the bumper may also vary. In one embodiment, the first stage element includes a single loop, wherein the single loop extends along all or substantially all of the length of the bumper. In this embodiment, the loop may be connected such that the portions of the loop connecting the first stage elements to the remainder of the bumper are solid or, in alternative embodiments, these portions may be slotted.

In an alternative embodiment, the bumper system may include a plurality of first stage elements. These first stage elements may be spaced equally or substantially equally along the length of the bumper. Alternatively, the first stage elements may be irregularly placed along the length of the bumper. In still another embodiment, the first stage elements may have irregular sizes and/or shapes as placed along the length of the bumper.

The first stage elements may be connected to the remainder of the bumper system using the open ends of the loops. Accordingly, in some embodiments, the loop is connected at two locations, the top and the bottom of the loop. As used herein, the term "connected" is intended to refer to any structure that is in contact with another structure. While the term "connected" may refer to a separate element that is chemically or mechanically connected to another element, the term may also be used to refer to a structure that is integrally formed with another structure, such as through a molding process, such that no separate process step is required to attach one structure to another, such as the attachment of a first stage element to a bumper.

In alternative embodiments, the single stage elements may include one or more additional connections to the remainder of the bumper system. In these embodiments, additional connectors or side straps may be used on the side of each loop. As previously discussed, these side straps may be chemically or mechanically connected, or they may be formed integrally with the remainder of the bumper system. The side straps may be used to help control progressive crushing of the bumper during a collision. The size and/or location of the side straps may vary. For example, in some embodiments, for one first stage element, a side strap may be located on one side of the element along the top, bottom or middle portions of the loop. In an alternative embodiment, a second side strap is used on the other side of the element, with this strap also being possibly located along the top, bottom or middle portions of the loop. In some embodiments wherein two side straps are used, the straps may be located along the same portion of the loop. In other embodiments, wherein two side straps are used, the straps may be located along different portions of the loop. It is also to be understood that more than one side strap may be used on one or both sides of each first stage element. It is also to be understood that, in some embodiments, if a plurality of first stage elements are used, each element may have the same number and/or location of side straps as every other element. Alternatively, in other embodiments, it is also to be understood that if a plurality of first stage elements are used, each element may have a different number and/or location of side straps as compared to each other element.

In still other embodiments, an elongated support strip may be used to provide additional support to each first stage element to provide added stability to the first stage elements. In some embodiments, the elongated strip may connected to each first stage element at or near the connection of each first stage element to the remainder of the bumper system such that the elongated strip runs in a direction that is substantially parallel to the longitudinal axis of the bumper. In other embodiments, the elongated strip may be located at the end of the first stage elements such that it forms an elongated support plate that would be designed to be the first part of the bumper system to contact any object hit by the bumper. In some embodiments, the elongated strip may be flat or substantially flat. In alternative embodiments, the elongated strip may be wavy or corrugated in shape. The elongated strip may be composed of the same material as this first stage elements or, in alternative embodiments, may be composed of a material that has a different stiffness than the first stage elements based upon the selected degree of support to be imparted by the elongated strip or plate. As with the other elements of the bumper system, the elongated strip may be connected chemically or mechanically, or it may be formed integrally with the remainder of the bumper system.

The first stage elements may be composed of any material capable of providing a lesser impact resistance than a standard bumper system. Examples of materials that may be used in the present invention include, but are not limited to, plastic materials, metal materials, foam materials, or a combination thereof. It may be beneficial to select a material for the first stage elements that has some degree of resiliency such that in a low-speed impact, the first stage elements do not break or crush, but rather spring back into shape after the impact force has been removed. As such, in very low speed collisions, the bumper can yield without damaging the object struck or the bumper itself.

In select embodiments of the present invention, the first stage elements may be constructed from a plastic material, such as a thermoplastic material. In beneficial embodiments, the plastic material is a thermoplastic material that is flexible at temperatures of about 200° C. to about −60° C. Examples of thermoplastic materials that may be used in the present invention include, but are not limited to, acrylonitrile-butadiene-styrene (ABS), polycarbonate (LEXAN® and LEXAN® EXL resins commercially available from General Electric Company), polycarbonate/ABS blend, a copolycarbonate-polyester, acrylic-styrene-acrylonitrile (ASA), acrylonitrile-(ethylene-polypropylene diamine modified)-styrene (AES), phenylene ether resins, glass filled blends of polyphenylene oxide and polystyrene, blends of polyphenylene ether/polyamide (NORYL GTX® resins from General Electric Company), blends of polycarbonate/polyethylene terephthalate (PET)/polybutylene terephthalate (PBT), polybutylene terephthalate and impact modifier (XENOY® resins commercially available from General Electric Company), polyamides, phenylene sulfide resins, polyvinyl chloride (PVC), high impact polystyrene (HIPS), low/high density polyethylene, polypropylene and thermoplastic olefins (TPO), polyethylene and fiber composites, polypropylene and fiber composites such as AZDEL Superlite™ sheets commercially available from AZDEL, Inc, long fiber reinforced thermoplastics (VERTON® resins commercially available from General Electric Company), or a combination including at least one of the foregoing thermoplastic materials.

It is to be understood that, in one embodiment, the same material may be used to make each first stage element, any side straps and/or any elongated strips. However, in alternative embodiments, the first stage elements may be designed to certain specifications such that different materials are used to make each first stage element. In addition, in alternative embodiments, different materials may be used to make different portions of the first stage element, if applicable. For example, a first material may be used to form the loop, a second material may be used to form any side straps, with a third material being used to form any elongated strips. As such, in some embodiments, the energy absorber may include a plurality of first stage elements, each having a different shape and/or size as well as being constructed from different materials. Alternatively, the energy absorber may include a plurality of first stage elements, each having a different shape and/or size as well as being constructed from the same material.

The materials used to form the first stage elements may be selected based on the method used to make each first stage element. In one embodiment, the first stage elements may be formed using any method capable of forming a first stage element having a lesser impact resistance. The method used may be chosen using one or more factors including, but not limited to, the materials used to form the first stage element, the type of motor vehicle in which the motor vehicle bumper will be used, and/or the size of the motor vehicle bumper to be formed. Examples of methods that may be used in the present invention include, but are not limited to, extrusion molding, blow molding, compression molding, injection molding, thermoforming, melt molding (such as co-extrusion molding, T-die extrusion, inflation extrusion, profile extrusion, extrusion coating and multi-layer injection molding) or a combination thereof.

In addition to the first stage elements used in the formation of the first energy absorbing stage of the dual stage bumper system, in alternative embodiments, the first energy absorbing stage may also include a plurality of intermediate elements that are located between the second stage of the bumper system and the first stage elements. In these embodiments, the first stage elements are connected to the intermediate elements, which are then connected to the second energy absorbing stage of the bumper system as opposed to having the first stage elements connected directly to the second stage. As with the other elements of the bumper system, the intermediate elements may be connected chemically or mechanically to the first stage elements and the second stage, or they may be formed integrally with the remainder of the bumper system.

In these embodiments, the intermediate elements may be designed to have a higher impact resistance than the first stage elements, but a lower impact resistance than the second stage of the bumper. Alternatively, the intermediate elements may have the same or lower impact resistance than the first stage elements.

As with the first stage elements, the intermediate elements may include one or more "C"-shaped loops or the same or varying size, with optional side straps and an optional elongated strip that may be straight or corrugated. The intermediate elements may also be formed from materials selected from plastic, foam, metal, or combination thereof. In addition, the intermediate elements may be formed using the same or a different method as used to form each first stage element. In select embodiments, the first stage elements, the intermediate elements and the second stage are integrally formed into a single component piece.

In an alternative embodiment, these intermediate elements may be spaced between the first stage elements. In this embodiment, the energy absorber has a plurality of elements spaced along the bumper, with the intermediate elements interspersed between the first stage elements. As such, when an energy absorber comes into contact with an object, the first stage elements are the ones that contact the object first, with the intermediate elements contacting the object later, if at all. In this embodiment, the first stage elements can be constructed with different geometries and/or from different materials such that the first stage elements are less rigid than the intermediate elements. As a result, the intermediate element can be constructed with different geometries and/or from different materials such that the intermediate elements are more rigid than the first stage elements.

In addition to the first energy absorbing stage, which may include first stage elements and optional intermediate elements, the bumper systems of the present invention include a second energy absorbing stage. The second energy absorbing stage of the bumper system is, in some embodiments, the portion closest to the motor vehicle and is designed to provide a higher impact resistance, such as those involved in high-impact/high-speed collisions. In alternative embodiments, the second stage is located furthest away from the motor vehicle with the first stage being located between the second stage and the motor vehicle. Accordingly, the second energy absorbing stage of the bumper system has a higher impact resistance than the first stage since the second energy absorbing stage is designed to provide the greatest protection to the motor vehicle in the event of a collision.

The second energy absorbing stage may take any shape capable of providing impact resistance to a motor vehicle while permitting first stage elements and/or intermediate elements to be connected thereto. In select embodiments, the second energy absorbing stage takes a shape of a standard bumper. In some embodiments, the second energy absorbing stage comprises a solid member, while in alternative embodiments, the second energy absorbing stage has openings therein.

The second energy absorbing stage may be made from any material capable of providing increased impact resistance to a motor vehicle in a high-speed and/or high-impact collision. Examples of materials that may be useful in forming the second energy absorbing stage include, but are not limited to, metal, plastic, or a combination thereof. In one embodiment, the second energy absorbing stage is formed from a plastic material, such as a thermoplastic material. Examples of thermoplastic materials that may be used to form the second energy absorbing stage include, but are not limited to, acrylonitrile-butadiene-styrene, polycarbonate, polycarbonate/ABS blends, a copolycarbonate-polyester, acrylic-styrene-acrylonitrile, acrylonitrile-(ethylene-polypropylene diamine modified)-styrene, phenylene ether resins, glass filled blends of polyphenylene oxide and polystyrene, blends of polyphenylene ether/polyamide, blends of polycarbonate/PET/PBT, polybutylene terephthalate and impact modifier, polyamides, phenylene sulfide resins, polyvinyl chloride, high impact polystyrene, low/high density polyethylene, polypropylene and thermoplastic olefins, polyethylene and fiber composites, polypropylene and fiber composites, long glass and/or long carbon fiber reinforced resins, or a combination thereof.

As with the first stage elements and any intermediate elements, in the methods used to form the second energy absorbing stage may include any capable of forming a second energy absorbing stage having an increased impact resistance. Examples of methods that may be used in the present invention include, but are not limited to, extrusion molding, blow molding, compression molding, injection molding, thermoforming, melt molding (such as co-extrusion molding, T-die extrusion, inflation extrusion, profile extrusion, extrusion coating and multi-layer injection molding) or a combination thereof. As previously discussed, in select embodiments, the method of forming the second stage will also be used to form the first stage elements and any intermediate elements such that these elements are integrally formed with one another to provide a bumper system that comprises a single piece.

The foregoing and other features of the present invention will be more readily apparent from the following detailed description and drawings of the illustrative embodiments of the invention wherein like reference numbers refer to similar elements.

Referring to the drawings, FIGS. 1-4 provide one embodiment of a dual-stage energy absorption bumper system according to the present invention. In this embodiment, the bumper system 100 includes a plurality of first stage elements 105 that are connected to a second energy absorbing stage 110. A support strip 115 is used to provide support to the connection between the first stage elements 105 and the second energy absorbing stage 110. In addition, two elongated strips 120 are provided along the top and bottom of the first stage elements to provide additional strength among the first stage elements 105.

Figure 1:
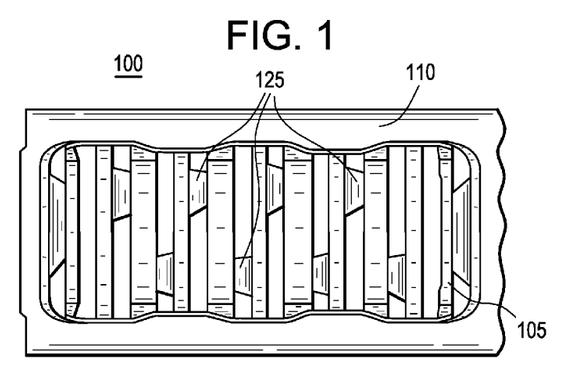
FIG. 1 is a front view of a dual stage bumper according to one embodiment of the present invention.
Figure 2:
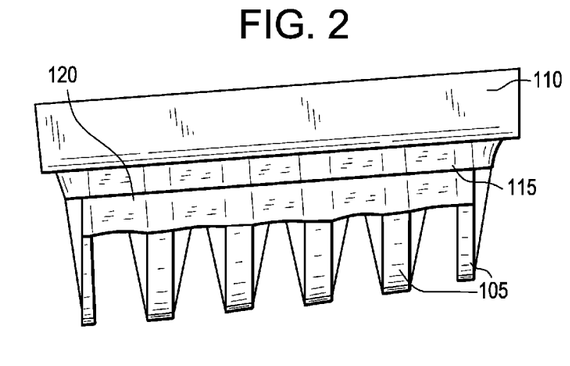
FIG. 2 is a top view of a dual stage bumper according to one embodiment of the present invention.
Figure 3:
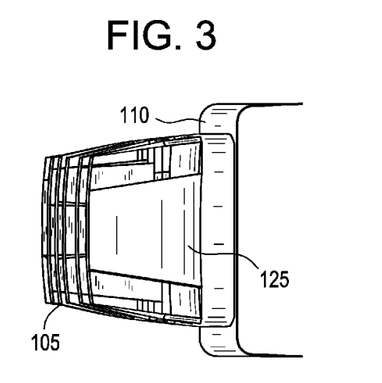
FIG. 3 is a side view of a dual stage bumper according to one embodiment of the present invention.
Figure 4:
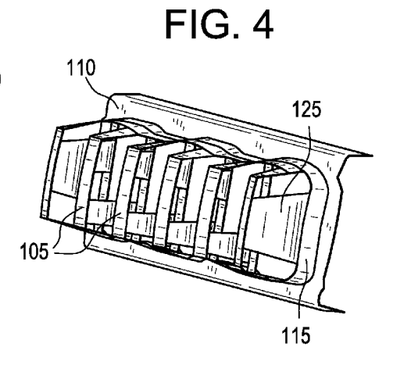
FIG. 4 is an isometric view of a dual stage bumper according to one embodiment of the present invention.

As may be seen in FIGS. 3 and 4, the first stage elements 105 are "C"-shaped. In addition, each first stage element 105 is shown with one or two side straps 125 along the side of each first stage element 105. As best seen in FIGS. 1 and 4, some side straps 125 are located on a top portion of the first stage element 105, along a bottom portion of the first stage element 105 or in the middle of the first stage element 105. Also, as may be seen in FIGS. 1 and 4, the elongated strips 120 and the support strip 115 may be corrugated in shape. Lastly, while the first stage elements 105 may have approximately the same size, as may be seen in FIG. 2, first stage elements 105 of different size may also be used.

Figure 5:
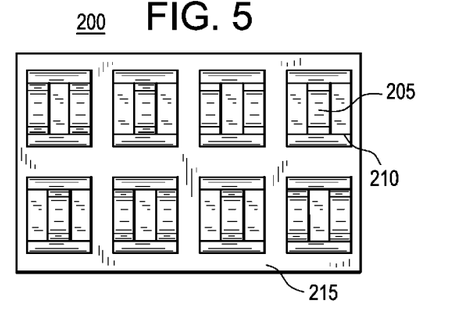
FIG. 5 is a front view of a dual stage bumper according to another embodiment of the present invention.
Figure 6:
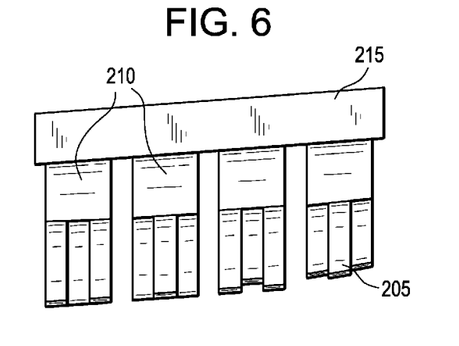
FIG. 6 is a top view of a dual stage bumper according to another embodiment of the present invention.
Figure 7:
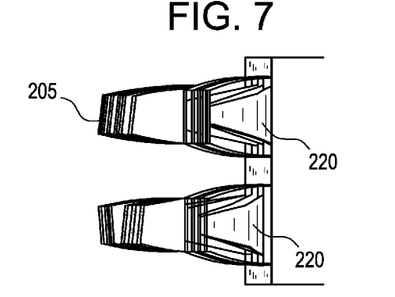
FIG. 7 is a side view of a dual stage bumper according to another embodiment of the present invention.
Figure 8:
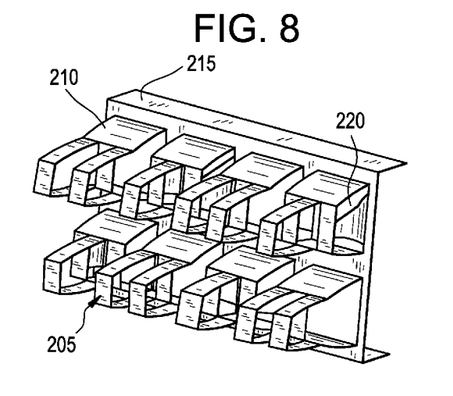
FIG. 8 is an isometric view of a dual stage bumper according to another embodiment of the present invention.
Figure 9:
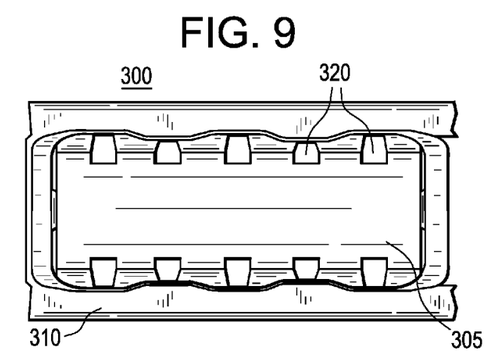
FIG. 9 is a front view of a dual stage bumper according to yet another embodiment of the present invention.
Figure 10:
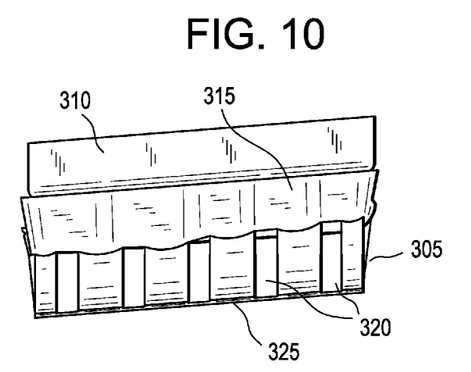
FIG. 10 is a top view of a dual stage bumper according to yet another embodiment of the present invention.

FIGS. 5-8 provide an alternative embodiment of a dual-stage energy absorption bumper system according to the present invention. In this embodiment, the bumper system 200 includes a plurality of first stage elements 205 that are connected to a plurality of intermediate elements 210 that are connected to the second energy absorbing stage 215. In these embodiments, no support strip or elongated strips are used. As may be seen, the intermediate elements 210 are placed in two rows along the second energy absorbing stage 215. However, it is to be understood that the intermediate elements 210 may be in a single row or in three or more rows. Also, as may be seen in FIGS. 7 and 8, the first stage elements 205 are "C"-shaped, as are the intermediate elements 210. In addition, some of the intermediate elements 210 include one or two side straps 220 along the side of the intermediate elements 210. Finally, as seen in FIG. 5, each intermediate element 210 may be designed to support one or two first stage elements 205, depending on the selected characteristics of the final bumper system.

FIGS. 9-12 provide yet another embodiment of a dual-stage energy absorption bumper system according to the present invention. In this embodiment, the bumper system 300 includes a plurality of first stage elements 305 that are connected to a second energy absorbing stage 310. A support strip 315 is used to provide support to the connection between the first stage elements 305 and the second energy absorbing stage 310. In this embodiment, each first stage element 305 is longer than the first stage elements depicted in the previous embodiments. As such, each first stage element 305 includes a plurality of slots 320 along the top bottom and/or sides of each first stage element 305. This embodiment may also be accomplished using first stage elements having a size similar to those depicted in previous embodiments but wherein an elongated support plate 325 is used.

Figure 11:
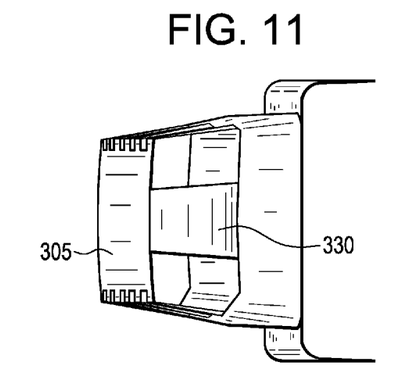
FIG. 11 is a side view of a dual stage bumper according to yet another embodiment of the present invention.
Figure 12:
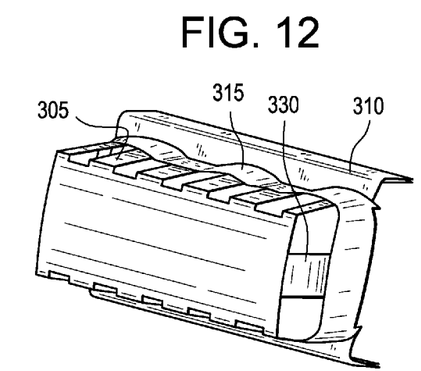
FIG. 12 is an isometric view of a dual stage bumper according to yet another embodiment of the present invention.

As may be seen in FIGS. 11 and 12, the first stage elements 305 are "C"-shaped. In addition, each first stage element 305 is shown with a side strap 330 along the side of each first stage element 305. As may be seen in FIGS. 9 and 12, the support strip 315 may be corrugated in shape.

Figure 13:
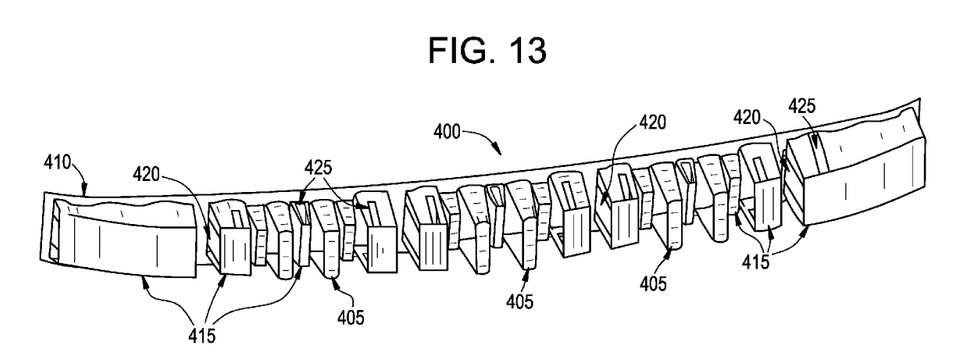
FIG. 13 is a perspective view of a dual stage bumper according to still another embodiment of the present invention.

FIG. 13 proves still another embodiment of a dual-stage energy absorption bumper system according to the present invention. In this embodiment, the bumper system 400 includes a plurality of first stage elements 405 that are connected to a second energy absorbing stage 410. This embodiment also includes a plurality of intermediate elements 415 that are interspersed between the first stage elements 405. Also, the first stage elements 405 and the intermediate elements 415 may or may not include one or more side straps 420 and/or slots 425 in each of the energy absorbing elements such that the resulting element 405, 415 has a different energy absorbing characteristic and/or crush characteristic when the respective element 405, 415 comes into contact with an object during a collision.

As may be seen, the first stage elements 405 do not have the same shape and/or size and the intermediate elements 415 also do not have the same shape and/or size. In addition, some elements 405, 415 include side straps and/or slots 425 while other elements 405, 415 do not. In fact, in the embodiment shown, the bumper system 400 includes seven different shapes and/or sizes for the system 400 such that the bumper system 400 could be said to have seven different energy absorbing elements, all having different rigidities and/or crush characteristics. And the present invention is not limited to seven different shaped elements and can include more or fewer depending on one or more factors including, but not limited to, the type of vehicle, the type/types of material used to form the bumper system, the shape of the energy absorbing elements, and the selected crush characteristics of each element and/or the bumper system as a whole.

In addition, while the embodiments depicted in the figures all show open first stage elements, it is to be understood that, in alternative embodiments, the first stage elements and/or any intermediate elements may be enclosed such that the side straps extend along the entirety of each first stage element and/or intermediate element thus creating a hollow element when the first stage element and/or intermediate element is connected to the second energy absorbing stage.

In another alternative embodiment, the stage elements and/or any intermediate elements may be formed as solid or substantially solid.

In still other alternative embodiments, the first stage elements and/or any intermediate elements may be enclosed such that the side straps extend along the entirety of each first stage element and/or intermediate element thus creating a hollow element when the first stage element and/or intermediate element is connected to the second energy absorbing stage. In these embodiments, another material, such as a foam or other cushioning material, may be used in the hollow portion of each first stage element and/or intermediate element to provide additional cushioning and/or impact resistance to the bumper system.

Lastly, while the first stage elements and/or intermediate elements are shown to be oriented along an axis substantially perpendicular to a longitudinal axis of the bumper system, it is to be understood that, in alternative embodiments, the first stage and/or intermediate elements may oriented along an axis that is substantially parallel to a longitudinal axis of the bumper system.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. An energy absorber system comprising;
   a) a first energy absorbing stage comprising at least one first stage element that comprises a looped structure and wherein the looped structure includes a closed portion of the loop that extends furthest away from the energy absorber system; and
   b) a second energy absorbing stage;
   wherein the first energy absorbing stage extends further away in the energy absorber system while the second energy absorbing stage is nested more rearward in the energy absorber system such that, in a collision, impact force contacts the first energy absorbing stage before contacting the second energy absorbing stage;
   further wherein the first energy absorbing stage has a first impact resistance and the second energy absorbing stage has a second impact resistance and the first impact resistance is less than the second impact resistance;
   further wherein the first energy absorbing stage and the second energy absorbing stage each comprise a plastic material.

2. The energy absorber system of claim 1, wherein the at least one first stage elements comprises a plurality of first stage elements.

3. The energy absorber system of claim 1, wherein the at least one first stage element comprises a "C"-shaped loop that is connected to the second energy absorbing stage at each end of the "C"-shaped loop.

4. The energy absorber system of claim 3, wherein the "C"-shaped loop has a substantially rectangular shape.

5. The energy absorber system of claim 1, wherein the at least one first stage element is integrally formed with the second energy absorbing stage.

6. The energy absorber system of claim 1, wherein the at least one first stage element comprises a plastic material that is selected from acrylonitrile-butadiene-styrene, polycarbonate, polycarbonate/acrylonitrile-butadiene-styrene blends, a copolycarbonate-polyester, acrylic-tyrene-acrylonitrile, acrylonitrile-(ethylene-polypropylene diamine modified)-styrene, phenylene ether resins, glass filled blends of polyphenylene oxide and polystyrene, blends of polyphenylene ether/polyamide, blends of polycarbonate/polyethylene terephthalate/polybutylene terephthalate, polybutylene terephthalate and impact modifier, polyamides, phenylene sulfide resins, polyvinyl chloride, high impact polystyrene, low/high density polyethylene, polypropylene and thermoplastic olefins, polyethylene and fiber composites, polypropylene and fiber composites, or a combination thereof.

7. The energy absorber system of claim 1, wherein the first energy absorbing stage further comprises at least one intermediate element located rearward of the at least one first stage element and forward of the second energy absorbing stage.

8. The energy absorber system of claim 7, wherein the at least one first stage element, the at least one intermediate element and the second energy absorbing stage are integrally formed with one another such that the energy absorber system comprises a single piece.

9. The energy absorber system of claim 7, wherein the at least one intermediate element comprises a plastic material selected from acrylonitrile-butadiene-styrene, polycarbonate, polycarbonate/acrylonitrile-butadiene-styrene blends, a copolycarbonate-polyester, acrylic-styrene-acrylonitrile, acrylonitrile-(ethylene-polypropylene diamine modified)-styrene, phenylene ether resins, glass filled blends of polyphenylene oxide and polystyrene, blends of polyphenylene ether/polyamide, blends of polycarbonate/polyethylene terephthalate/polybutylene terephthalate, polybutylene terephthalate and impact modifier, polyamides, phenylene sulfide resins, polyvinyl chloride, high impact polystyrene, low/high density polyethylene, polypropylene and thermoplastic olefins, polyethylene and fiber composites, polypropylene and fiber composites, or a combination thereof.

10. The energy absorber system of claim 1, wherein the at least one first stage elements comprises a plurality of first stage elements and wherein the first energy absorbing stage further comprises at least one intermediate element interspersed between the plurality of first stage elements.

11. The energy absorber system of claim 1, wherein the first energy absorbing stage comprises a plurality of first stage elements and further comprising an elongated strip connecting at least some of the first stage elements to one another.

12. The energy absorber system of claim 1, wherein the elongated strip is corrugated in shape.

13. The energy absorber system of claim 1, wherein the first energy absorbing stage comprises a plurality of first stage elements and further comprising a support strip connecting at least some of the first stage elements to the second energy absorbing stage.

14. The energy absorber system of claim 13, wherein the support strip is corrugated in shape.

15. The energy absorber system of claim 1, wherein the second energy absorbing stage comprises a plastic material selected from acrylonitrile-butadiene-styrene, polycarbonate, polycarbonate/acrylonitrile-butadiene-styrene blends, a copolycarbonate-polyester, acrylic-styrene-acrylonitrile, acrylonitrile-(ethylene-polypropylene diamine modified)-styrene, phenylene ether resins, glass filled blends of polyphenylene oxide and polystyrene, blends of polyphenylene ether/polyamide, blends of polycarbonate/polyethylene terephthalate/polybutylene terephthalate, polybutylene terephthalate and impact modifier, polyamides, phenylene sulfide resins, polyvinyl chloride, high impact polystyrene, low/high density polyethylene, polypropylene and thermoplastic olefins, polyethylene and fiber composites, polypropylene and fiber composites, long glass and/or long carbon fiber reinforced resins, or a combination thereof.

\* \* \* \* \*